May 10, 1938.  E. C. HORTON  2,116,894
SUCTION PUMP
Filed April 26, 1935
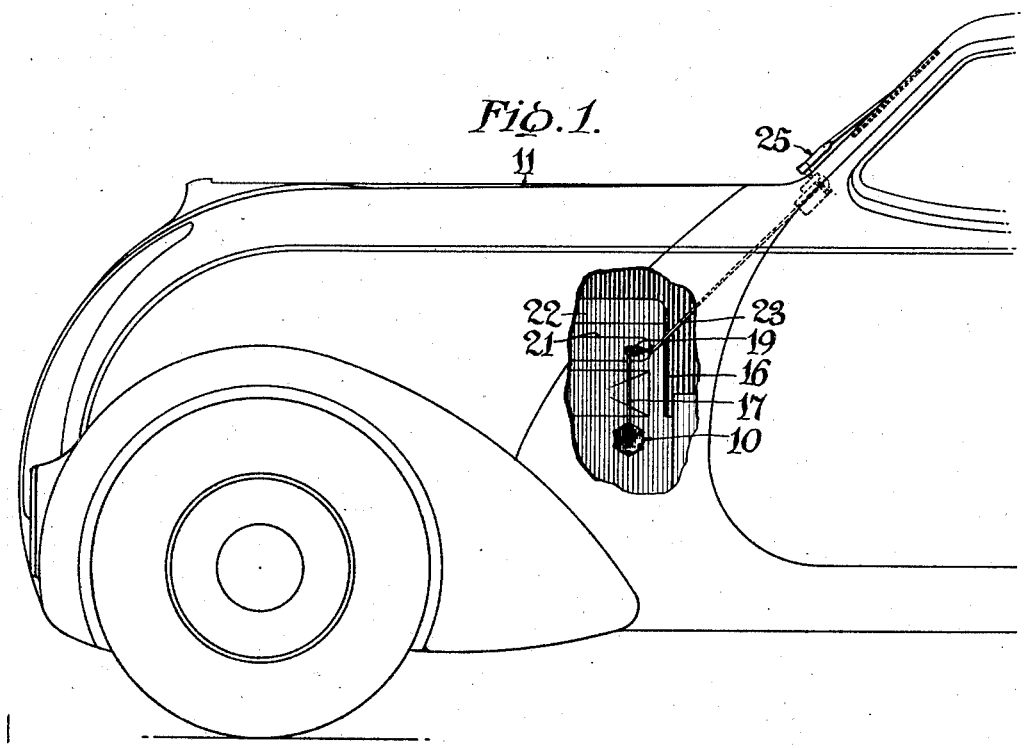
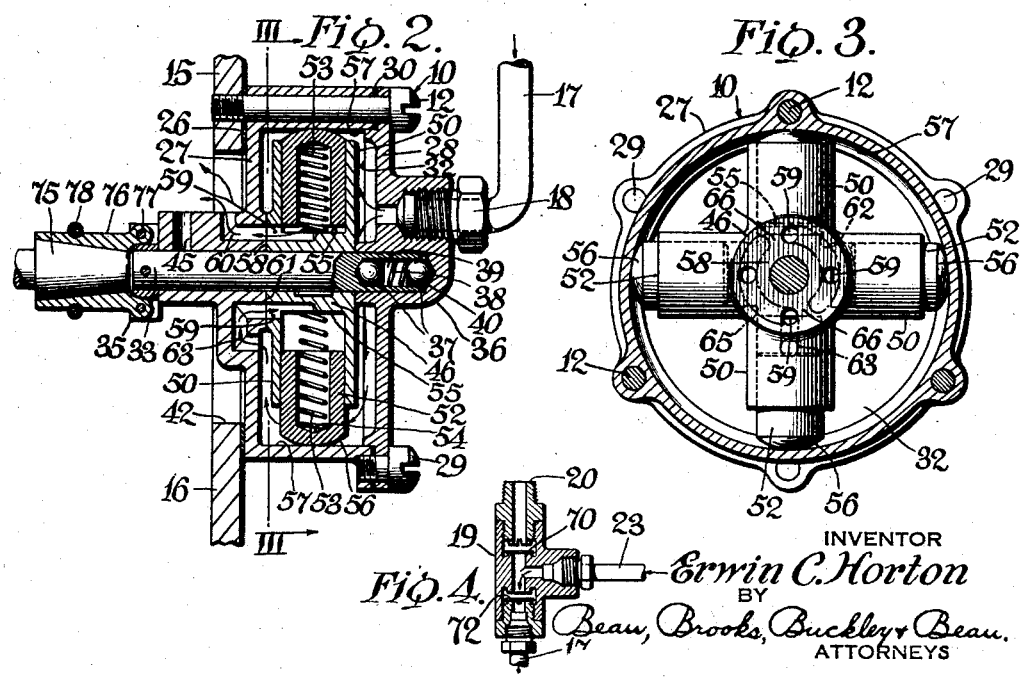
INVENTOR
*Erwin C. Horton*
BY
*Beau, Brooks, Buckley & Beau.*
ATTORNEYS Patented May 10, 1938

2,116,894

UNITED STATES PATENT OFFICE 2,116,894

SUCTION PUMP

Erwin C. Horton, Hamburg, N. Y., assignor to Trico Products Corporation, Buffalo, N. Y.

Application April 26, 1935, Serial No. 18,473

5 Claims. (Cl. 230—38)

This invention relates to suction pumps and it has particular relation to suction pumps for operating windshield cleaners and to an arrangement insuring improved mode of lubrication of the pump by the operation of the latter.

One object of the invention is to provide an improved mode of lubrication of a suction pump.

Another object of the invention is to provide an improved arrangement for cooperation of a lubricating system of an internal combustion engine crank and a suction pump for lubricating the latter.

In the drawing:

Fig. 1 is a fragmentary elevation of a motor vehicle having a suction pump and connection for operating the windshield cleaner installed thereon;

Fig. 2 is a vertical section, on a larger scale, of a suction pump unit;

Fig. 3 is a cross section taken substantially along the line III—III of Fig. 2; and Fig. 4 is a cross section of a plural valve structure for controlling the passage of air from a windshield cleaner.

In practicing the invention a rotary suction pump 10 for operation in a motor vehicle 11 is provided with screw bolts 12 securing it in fluid tight relation upon a wall 15 of a motor vehicle crank case 16, and a conduit 17 having a nipple connection 18 communicating with the interior of the pump is connected to a hollow T-connection 19 having a conduit connection 20 screwed into an intake manifold 21 of the motor vehicle engine 22. This T-connection 20 has another conduit section 23 communicating with a windshield cleaner 25 operated in a conventional manner by differential fluid pressure. A gasket 26 is interposed between the casing 10 and crank case wall 15.

The pump 10 comprises casing sections 27 and 28 secured together by means of the mounting bolts 12 and additional screw bolts 29 to insure sealing of the casing sections which have a gasket 30 interposed between them. These casing sections form an inner chamber 32. A driven shaft 33 is mounted through intermediate portions of the casing sections and is journalled in bearing bosses 35 and 36 formed upon opposed portions of the casing sections. Thrust ball bearings 37 having a coil spring 38 between them are disposed in a socket 39 formed at the end of the shaft and the outer ball 38 bears against an end wall 40 of the boss 36.

The bearing boss 35 extends inwardly through an opening 42 in the crank case wall 15 and has an opening 45 extending upwardly and entirely through the boss wall to the bearing zone of the shaft 33 to insure lubrication of the shaft with oil supplied in the crank case. Splashing of the oil maintains a supply in the opening 45 during operation of the engine.

The shaft 33 is rigidly secured to a hub 46 having cylinders 50 radiating integrally therefrom and opening outwardly in radial directions. A hollow plunger or piston 52 is reciprocally mounted in each cylinder 50 and a coil spring 53 having one end disposed in a socket 54 formed in each plunger has its other end resting upon the inner or bottom wall 55 of each cylinder. This spring is normally under compression and always tends to actuate the plunger 52 radially outwardly.

Each plunger is formed with a rounded outer end 56 which slidably engages an inner cylindrical wall 57 of the casing section 27 defining the chamber 32. This wall is described about an axis eccentrically located with respect to the axis of the shaft 33.

An inner side face 58 (Fig. 3) of the hub 46 is provided with a duct 59 communicating with each cylinder 50 through its bottom wall 55. These ducts 59 are radially spaced equally from the axis of the shaft 33; that is, from the axis of rotation of the hub. Inner casing wall faces 61 abut the hub face 58 and the opposite hub face. It will be observed that the shorter distance from the axis of the shaft 33 to the inner cylindrical wall 57 is indicated between the walls 55 and 57 at the upper portion of Fig. 2, and that the greater relative distance between these parts is indicated between these walls at the lower portion of this figure.

A duct 60 formed through the wall of the casing section 27 communicates with the interior of the crank case through the opening 42 and with a curved groove 62 described arcuately about the axis of the shaft 33 as a center and registering with each duct 59 throughout approximately one half of a revolution of the hub.

A second substantially U-shaped duct 63 communicates through the face of the hub and through a portion of the wall of the casing into the chamber 32, and further communicates with a curved groove 65 described arcuately in the same manner as the groove 62, but disposed in opposed relation thereto with respect to opposite sides of the axis of the shaft 33. These grooves 62 and 65 are separated by partitions 66 adjacent their ends and each duct 59 communicates with the groove 65 and with the chamber 32 throughout approximately one half of a revolution of the hub.

In rotating the hub, air is drawn through the conduit 17 into the chamber 32 and through the duct 63, groove 65, and duct 59 into each cylinder as the spring 53 actuates each plunger 52 outwardly into the lower portion of the chamber. Then in the upper portion of the chamber each plunger 52 is actuated inwardly and the air previously drawn into the cylinder will be expelled into and through the duct 59, groove 62 and duct 60 into the crank case 16.

This action creates a partial vacuum or sub-atmospheric pressure in the chamber 32 and atmospheric pressure acting upon the windshield part operates the latter in a well known manner. During the operation of the vehicle engine oil is splashed in a conventional manner inside the crank case and portions of such oil enter the opening 45 leading to the shaft 33, and hence, the latter is lubricated. The sub-atmospheric pressure in the chamber 32 draws slight amounts of oil through the bearing of the shaft into the chamber 32 and into the cylinders 50, in addition to certain amounts of oil seeping through the bearings under inherent capillary action. However, if there is a tendency of the oil to accumulate in the chamber or in the cylinders, the air forced out through the ducts 60 will carry the excess oil back to the crank case. Hence a uniform and efficient lubrication of the pump parts is insured by the operation of these parts.

The T-connection shown in Fig. 4 is provided with a valve 70 for controlling the passage of air to the sub-atmospheric zone of the intake manifold 21, and with a second valve 72 for controlling the passage of air to the suction pump 10. These valves provide for communication with the windshield cleaner from either the intake manifold or from the pump, depending upon which is subjected to the lower pressure, that is, when the pressure becomes greater in the intake manifold than in the pump, the valve 70 is closed and the valve 72 is opened to establish communication with the lower pressure zone in the pump. Conversely, when the pressure is greater in the pump, the valve 70 is opened and the valve 72 is closed in order to establish communication from the windshield cleaner to the intake manifold.

In supplying power for the pump from a variable speed rotatable drive shaft 75 driven conventionally from the engine 16, centrifugally actuated clutch members 76 are pivotally mounted, as indicated at 77, upon the outer end portion of the shaft 33 and a spring 78 surrounding the clutch members at a location spaced from the pivot points 77, urges the clutch members into frictional contact with a tapered portion 79 of the driven member 75. At predetermined speed, determined by the resistance of the spring 78, centrifugal force acting upon the clutch members pivots them outwardly to release the tapered portion 79 of the driven member. Hence, above predetermined speed of the drive shaft 75 the speed of the pump shaft 33 will remain uniform and the uniformity of speed of the pump shaft causes uniformity of passage of the lubricant into the pump, through the cylinders and through the ducts 59—60 back into the crank case.

Although only one form of the invention has been shown and described in detail, it will be apparent to those skilled in the art that the invention is not so limited, but that various changes may be made therein without departing from the spirit of the invention or from the scope of the invention defined in the appended claims.

I claim:

1. In a suction pump mounted upon the crank case of an engine having a pump driving member therein, a pump casing having a bearing opening at the inner side thereof that faces the crank case, a pump shaft journaled in said bearing opening and engaging the pump driving member for being operated thereby, a piston receiving cylinder carried rigidly and radially on the pump shaft, said cylinder having a chamber and a valved inlet conduit communicating into the cylinder chamber, said casing having an outlet conduit leading from the casing into the crank case, said casing having an inner cam surface, a piston contacting said cam surface and movable in the cylinder by the cam surface in response to rotation of the shaft, said cylinder having an outlet conduit intermittently communicating with the outlet conduit of the casing during inward movement of the piston in the cylinder, whereby lubricant in the crank case entering the cylinder through the bearing will be discharged through said outlet into the crank case.

2. In a suction pump associated with a motor vehicle engine having a crank case, a pump casing having a bearing opening disposed within said crank case, a pump shaft journalled in said bearing opening and drive means for operating said shaft, a piston receiving cylinder radially disposed upon said pump shaft for rotation therewith and having a chamber and a valved inlet conduit communicating with the cylinder chamber, an outlet conduit for said casing discharging into said crank case, said casing having an inner cam surface, a piston in said cylinder and movable therein, by said cam surface in response to rotation of the shaft, said chamber having an outlet conduit communicating intermittently with the outlet conduit of the casing during inward movement of the piston in the cylinder whereby lubricant from the crank case entering the chamber through the bearing will be discharged through said outlet into the crank case.

3. In a suction pump mounted upon the crank case of an engine, a pump casing having a bearing opening in open communication with the interior of the crank case, a pump shaft journalled in said bearing opening and drive means for actuating said shaft, a piston receiving cylinder carried radially on the pump shaft for rotation therewith, said cylinder having a chamber and a valved inlet conduit communicating with the cylinder chamber, said casing having an outlet conduit discharging into the crank case, said casing having an inner cam surface, a piston contacting said cam surface and movable in the cylinder by the cam surface in response to rotation of the shaft, said cylinder having an outlet conduit intermittently communicating with the outlet conduit of the casing during inward movement of the piston in the cylinder, whereby lubricant in the crank case entering the cylinder through the bearing will be discharged through said outlet into the crank case.

4. In a suction pump mounted upon the crank case of an engine having a pump driving member therein, a pump casing having a bearing opening in communication with the interior of the crank case, a pump shaft journalled in said bearing opening and engaging the pump driving member for being operated thereby, a piston receiving cylinder carried rigidly and radially on the pump shaft for rotation therewith, said cylinder having a chamber and a valved inlet conduit communicating with the cylinder chamber, said casing having an inner cam surface, a piston contacting said cam surface and movable in the cylinder by the cam surface in response to rotation of the shaft, said cylinder having a valved outlet conduit discharging into the crank case whereby lubricant in the crank case entering the cylinder through the bearing will be discharged through said outlet into the crank case.

5. In a suction pump mounted upon the crank case of an engine having a pump driving member therein, a pump casing having an air inlet conduit and a bearing opening in communication with the interior of the crank case, a pump shaft journaled in said bearing opening and engaging the pump driving member for being operated thereby, a piston receiving cylinder within said casing and secured to said shaft for rotation therewith and having a chamber with a valved inlet conduit communicating with the casing, a piston reciprocable in the cylinder and forming therewith an air pumping unit to evacuate the casing, and means operative upon rotation of the shaft to reciprocate the piston in the cylinder, said cylinder having a valved outlet conduit discharging into the crank case whereby lubricant in the crank case entering the casing through the bearing will be returned through said outlet into the crank case.

ERWIN C. HORTON.